UNITED STATES PATENT OFFICE.

WILLIAM H. ROSS, CHARLES B. DURGIN, AND RUSSELL M. JONES, OF WASHINGTON, DISTRICT OF COLUMBIA, DEDICATED, BY MESNE ASSIGNMENTS, TO THE PEOPLE OF THE UNITED STATES.

PROCESS FOR THE PURIFICATION OF COMMERCIAL PHOSPHORIC ACID BY CRYSTALLIZATION.

No Drawing.      Application filed April 19, 1922. Serial No. 555,602.

(FILED UNDER THE ACT OF MARCH 3, 1883, 22 STAT. L., 625.)

*To all whom it may concern:*

Be it known that we, WILLIAM H. ROSS, CHARLES B. DURGIN, and RUSSELL M. JONES, citizens of the United States of America, and employees of the Department of Agriculture of the United States of America, residing at Washington, D. C., have invented a new and useful Process for the Purification of Commercial Phosphoric Acid by Crystallization, of which the following is a specification.

This application is made under the act of March 3, 1883, chapter 143 (22 Stat., 625) and the invention herein described and claimed may be used by the Government of the United States or any of its officers or employees in the prosecution of work for the Government, and any person in the United States without the payment to us of any royalty thereon.

This invention relates to a simple, economical and efficient method for the purification of commercial phosphoric acid by the process of crystallization.

The principal sources of phosphoric acid are charred bones and phosphate rock. Two methods known as the sulfuric acid and volatilization methods are in use for preparing phosphoric acid from these sources.

In the sulfuric acid method the phosphatic material is treated with a sufficient quantity of sulfuric acid to set free the phosphoric acid which is then filtered off, purified and concentrated to such a degree as the industry for which it is intended may demand.

In the volatilization method phosphate rock is smelted in an electric furnace with a mixture of sand and coke and at such a temperature that the phosphorous is volatilized and escapes from the furnace as oxide fumes. For the recovery of the fumes the application of the Cottrell precipitator as described in U. S. Patent No. 1,283,398, Oct. 29, 1918, has been found most efficient and economical. As the fumes pass from the furnace they react with the moisture of the air met with in their passage to the Cottrell system and are precipitated in the form of a solution of ortho-phosphoric acid.

When phosphoric acid is prepared from phosphate rock by the sulfuric acid method it will be found to contain greater or less amounts of all the constituents occurring in the raw materials used, such as calcium, iron, aluminum, manganese, sulfur, chlorine, fluorine, arsenic and lead. Volatilized acid will ordinarily be found to contain relatively small amounts of the non-volatile constituents of the raw materials but its content of lead, arsenic and fluorine may approach or even sometimes exceed that occurring in acid prepared by the sulfuric acid method. As these constituents are of a poisonous nature they must be eliminated as far as possible from acid intended for use in food products. According to present practice this is done by precipitation with the aid of suitable reagents. Thus arsenic and lead may be removed with a sulfide or hydrogen sulfide while fluorine may be precipitated with lime or soda. The effectiveness of this method of purification is limited however by the solubility of the precipitate in the acid and complete removal of the impurities is therefore not possible by the method of chemical precipitation.

This invention has for its object a simple and economical method for bringing about the complete elimination of all impurities occurring in phosphoric acid.

We have found that when phosphoric acid is evaporated at a temperature below 150° C. to a specific gravity of $$1.85 \frac{20°}{20°} C.,$$

or above, cooled below 40° C., and then inoculated with a crystal of phosphoric acid, the greater part of the acid will quickly crystallize to a solid mass leaving the impurities in the mother liquor. On separating the latter from the crystals by centrifugal or other means a product will be obtained of a much higher degree of purity than the original acid. Thus an acid which contained 430 parts of lead per million, an amount greatly in excess of the limit allowed in a food product, was found to give at a specific gravity of $$1.85 \frac{20°}{20°} C.$$

a 55 per cent yield of crystals with a lead content of only 20 parts per million. A corresponding reduction in the content of the other impurities was also noted. We have found that if the concentration of the acid is made at a temperature much above 150° C. the ortho acid will change either wholly or in part into less hydrated forms of the acid and crystallization will then not take place at all or only slowly after being allowed to stand for a time.

Crystalline phosphoric acid is very deliquescent and will melt in the moisture absorbed from the air if allowed to stand in an open vessel. It is therefore important that a closed equipment be used for centrifuging the acid in order to prevent any considerable quantity of air coming in contact with the crystals.

When an acid is prepared by the volatilization method and collected in a Cottrell precipitator as already described it is possible to recover the acid directly of any desired concentration by simply adjusting the amount of heat lost by radiation from the recovery system. If the temperature of the gases passing through the system is kept at a temperature of 100° C. or above, the precipitated acid will then be of such a concentration that it will crystallize to a solid mass on cooling. With acid prepared in this way no initial concentration by evaporation is necessary for crystallization. All that is then required to obtain any desired ratio of crystals to mother liquor is to adjust the acid to the proper specific gravity by adding water or cooling, according as the acid is initially too concentrated or too dilute. If the acid as collected is already of the proper specific gravity it may be centrifuged directly without any preliminary treatment.

By recrystallizing the acid obtained in the first crop of crystals a product of a still higher degree of purity may be readily obtained. This can be done most conveniently by heating the crystals above 40° C. until the whole mass becomes liquid, cooling below 40° C., adjusting the specific gravity to about 1.85 as before by the addition of the proper amount of water, again inoculating and centrifuging.

The process of crystallization does not remove the impurities from all the acid but simply brings about their concentration in the mother liquors. This offers no disadvantage if the acid is produced for use in fertilizers as well as in those industries which require a high grade acid. The presence of such constituents as lead and arsenic in amounts which would make an acid unsuited for use in food stuffs would not depreciate its value as a fertilizer and the crystallization method is therefore suggested as a possible means of preparing high grade phosphoric acid as a by-product in the volatilization method of manufacturing phosphatic fertilizers.

What we claim is:—

1. A process for the purification of phosphoric acid which consists in evaporating the acid at a temperature below 150° C. to a specific gravity of $1.85 \frac{20°}{20°}$ C., or above, then cooling the same to a temperature below 40° C., then inoculating the same with a crystal of phosphoric acid, then centrifuging the resulting crystalline mass to effect a separation of the crystals from the mother liquor, then melting the said crystals at a temperature above 40° C., then adding water to the said melted crystals to bring same to a specific gravity of $1.85 \frac{20°}{20°}$ C., or above, cooling below 40° C., subsequently inoculating said melted crystals with a crystal of phosphoric acid, centrifuging and repeating as desired.

2. A process for the purification of phosphoric acid which consists in evaporating at a temperature below 150° C. to a specific gravity of $1.85 \frac{20°}{20°}$ C., or above, cooling below 40° C., inoculating with a crystal of phosphoric acid and centrifuging the resulting crystalline mass.

3. A process for the purification of phosphoric acid which consists in evaporating at a temperature below 150° C. to a specific gravity of $1.85 \frac{20°}{20°}$ C., or above, cooling below 40° C. and centrifuging the resulting crystalline mass.

4. A process for the purification of phosphoric acid which consists in evaporating at a temperature below 150° C. to a specific gravity of $1.85 \frac{20°}{20°}$ C., or above, cooling below 40° C., inoculating with a crystal of phosphoric acid and separating the resulting crystalline mass from mother liquor.

5. A process for the purification of concentrated phosphoric acid which consists in cooling to such a temperature as to give a specific gravity of $1.85 \frac{20°}{20°}$ C., or above, inoculating with a crystal of phosphoric acid, centrifuging the resulting crystalline mass, melting the crystals at a temperature above 40° C., adding water to bring to a specific gravity of 1.85 $\frac{20°}{20°}$ C., or above, cooling below 40° C., inoculating with a crystal of phosphoric acid, centrifuging and repeating as desired.

6. A process for the purification of concentrated phosphoric acid which consists in cooling to such a temperature as to give a specific gravity of 1.85 $\frac{20°}{20°}$ C., or above, inoculating with a crystal of phosphoric acid and centrifuging the resulting crystalline mass.

7. A process for the purification of concentrated phosphoric acid which consists in cooling to such a temperature as to give a specific gravity of 1.85 $\frac{20°}{20°}$ C., or above, and centrifuging the resulting crystalline mass.

8. A process for the purification of concentrated phosphoric acid which consists in cooling to such a temperature as to give a specific gravity of 1.85 $\frac{20°}{20°}$ C., or above, inoculating with a crystal of phosphoric acid and separating the resulting crystalline mass from the mother liquor.

9. A process for the purification of concentrated phosphoric acid which consists in diluting with water to a specific gravity of 1.85 $\frac{20°}{20°}$ C., or above, inoculating with a crystal of phosphoric acid, centrifuging the resulting crystalline mass, melting the crystals at a temperature above 40° C. adding water to bring to a specific gravity of 1.85 $\frac{20°}{20°}$ C., or above, cooling before 40° C., inoculating with a crystal of phosphoric acid, centrifuging and repeating as desired.

10. A process for the purification of concentrated phosphoric acid which consists in diluting with water to a specific gravity of 1.85 $\frac{20°}{20°}$ C., or above, inoculating with a crystal of phosphoric acid and separating the resulting crystalline mass from the mother liquor.

11. A process for the purification of crystalline phosphoric acid, which consists in centrifuging, melting the crystals at a temperature above 40° C. adding water to bring to a specific gravity of 1.85 $\frac{20°}{20°}$ C., or above, cooling below 40° C., inoculating with a crystal of phosphoric acid, centrifuging and repeating as desired.

WILLIAM H. ROSS.
CHARLES B. DURGIN.
RUSSELL M. JONES.